(12) United States Patent
Biskeborn et al.

(10) Patent No.: US 7,679,855 B2
(45) Date of Patent: Mar. 16, 2010

(54) WRITE TRANSDUCER AND SYSTEM IMPLEMENTING SAME

(75) Inventors: Robert Glenn Biskeborn, Hollister, CA (US); Philipp Herget, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 344 days.

(21) Appl. No.: 11/759,778

(22) Filed: Jun. 7, 2007

(65) Prior Publication Data

US 2008/0304184 A1 Dec. 11, 2008

(51) Int. Cl.
*G11B 5/02* (2006.01)

(52) U.S. Cl. .......................................... 360/68

(58) Field of Classification Search ................ 360/68, 360/46, 67, 31, 246, 315; 369/62, 13.23, 369/30.27
See application file for complete search history.

(56) References Cited

U.S. PATENT DOCUMENTS

| | | | | |
|---|---|---|---|---|
| 4,277,808 A * | 7/1981 | Nagaki | ........................ | 360/315 |
| 4,622,599 A * | 11/1986 | Norton, Jr. | .................... | 360/31 |
| 5,181,050 A | 1/1993 | Bible et al. | .................. | 346/155 |
| 5,608,591 A | 3/1997 | Klaassen | ..................... | 360/104 |
| 5,717,547 A * | 2/1998 | Young | ........................ | 360/246 |
| 6,031,807 A * | 2/2000 | de la Soujeole | ............... | 369/62 |
| 6,331,919 B1 | 12/2001 | Klaassen et al. | .............. | 360/46 |
| 6,529,448 B1 * | 3/2003 | Ishii et al. | ................ | 369/13.23 |
| 6,603,623 B1 | 8/2003 | Fontana, Jr. et al. | ........... | 360/48 |
| 6,633,446 B1 * | 10/2003 | Sako | ........................... | 360/67 |
| 6,775,078 B2 * | 8/2004 | Jiang | ........................... | 360/46 |
| 6,859,423 B1 * | 2/2005 | Yoshikawa | ............... | 369/30.27 |
| 7,417,818 B2 * | 8/2008 | Yuuki et al. | .................. | 360/68 |
| 7,522,368 B2 * | 4/2009 | Xia et al. | ...................... | 360/67 |
| 2007/0236164 A1 * | 10/2007 | Xia et al. | .................... | 318/632 |

* cited by examiner

*Primary Examiner*—Fred Tzeng
(74) *Attorney, Agent, or Firm*—Zilka-Kotab, PC (57) ABSTRACT

A magnetic, head in one embodiment includes a substrate; a write transducer; leads coupled to the write transducer; and a resistor coupled between one of the leads and the substrate or a common line. A magnetic storage system in another embodiment includes a cable having a characteristic impedance associated with a pair of conductors; a write signal generator coupled to the pair of conductors; at least one first device coupled to the cable in series with the write signal generator and at least one of the cable conductors, the at least one first device providing a first impedance; at least one second device providing a second impedance and coupled to a second end of the cable in series with at least one of the cable conductors and the first device; and a head having a write transducer coupled to the at least one second device.

15 Claims, 6 Drawing Sheets

WRITE TRANSDUCER AND SYSTEM IMPLEMENTING SAME

FIELD OF THE INVENTION

The present invention relates to magnetic storage system components, and more particularly, this invention relates to the design of the write driver circuit used to power the magnetic writer(s) in a magnetic head.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. In operation the magnetic storage medium, such as a tape or a magnetic disk surface, is passed over the magnetic read/write (R/W) head assembly for reading data therefrom and writing data thereto.

As capacity increases, it is desirable to also increase the system's performance which includes the data rate during writing operations. One limitation to this data rate is the current rise time in the inductive coil of the writer. Several factors limit this current rise time. One factor of particular interest is the retardation of the rise time due to impedance mismatching between the output impedance of the write driver and the characteristic impedance of the cable. Such impedance mismatching results in reflections which lead to slower current rise times.

What is therefore needed is a way to improve the matching between write signal generator circuit and the characteristic impedance of the cable used to deliver power to the write head.

One solution to the problem is to change the output impedance of the write drive to match the characteristic impedance of the cable. However, in a voltage type driver, the output resistance is dominated by a series resistance which is chosen to set the steady state current required for optimally written magnetic patterns on the tape. Since the write current is generally determined by the write head design, there is not much freedom in the design to change the value of this series resistance.

A second possible solution is to adjust the cable conductor width and spacing and insulator dielectric constant to produce a cable with a characteristic impedance which matches the series resistance. However, cable fabrication technology and restrictions on the cable flexibility limit the range of impedances that can be achieved with the cable.

A third solution is to move the write signal generator proximate to the head, thus effectively removing the cable impedance from the write signal generator circuit. However, this has the disadvantage that logic signal lines must be added to the cable, making the cabling more complex and stiff. Further, the write driver becomes more complex and there may not be enough space for locating the driver chip proximate to the head.

SUMMARY OF THE INVENTION

A magnetic storage system according to one embodiment includes a cable having a characteristic impedance associated with a pair of conductors thereof; a write signal generator coupled to the pair of conductors towards a first end of the cable; at least one first device coupled to the first end of the cable in series with the write signal generator and at least one of the cable conductors, the at least one first device providing a first impedance; at least one second device coupled to a second end of the cable in series with at least one of the cable conductors and the first device, the at least one second device providing a second impedance; and a head having a write transducer coupled to the at least one second device.

In one approach, the first impedance approximately matches the cable's characteristic impedance. In another approach, the first impedance is greater than the cable's characteristic impedance. In yet another approach, the first impedance is less than the cable's characteristic impedance.

The at least one second device may formed on the head. Such second device may be in series or in parallel with the write transducer. In one approach, the at least one second device includes a resistor comprising tantalum.

In an alternate embodiment, the at least one second device is integral with the cable. In yet another alternate embodiment, the at least one second device is positioned between the cable and the head.

Two first devices may be present, impedances provided by the first devices may be about the same or different. Two second devices may also be present, preferably with at least one second device is in parallel with the write transducer. A third device may be coupled to the conductors of the cable towards the second end of the cable, the third device providing a third impedance across the conductors.

A magnetic head according to another embodiment includes a substrate; a write transducer; leads coupled to the write transducer; and a resistor coupled between one of the leads and the substrate or a common line.

A magnetic storage system according to yet another embodiment includes a cable having a first conductor and a second conductor, the cable having a characteristic impedance; a write signal generator coupled to the first conductor towards a first end of the cable; a first device coupled to the first conductor towards the first end of the cable in series with the write signal generator and the cable, the first device providing a first impedance; a second device coupled to the first conductor towards a second end of the cable in series with the cable and the first impedance, the second device providing a second impedance; a third device coupled to the second conductor towards the first end of the cable in series with the cable, the third device providing a third impedance; a fourth device coupled to the second conductor towards the second end of the cable in series with the cable, the fourth device providing a fourth impedance; and a head having a write transducer connected in series with the conductors of the cable.

In one approach, the second device and the fourth device are in parallel with the write transducer. In another approach, the second device and the fourth device are in series with the write transducer.

A magnetic storage system according to yet another embodiment includes a cable having a characteristic impedance associated therewith; a head having a write transducer coupled to the cable; a write signal generator coupled to a first end of the cable; at least one first device coupled to the cable towards the first end of the cable in series with the write signal generator, the at least one first device providing a first impedance; and at least one second device formed on the head and coupled in series with the cable, the at least one second device providing a second impedance.

Any of these embodiments may be implemented in a tape drive system, which may include a magnetic head, a drive mechanism for passing a magnetic, recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new system that improves the matching between write signal generator circuit and characteristic impedance of the write head cable. In one embodiment, the write signal generator impedance is separated into two components. One remains on the circuit board, while the other is placed towards the end of the cable near the write transducer itself (e.g., on the head, on the cable, or between the head and cable). This splitting of impedances gives circuit designers more flexibility in adapting write signal generator impedance to the cable and so helps alleviate cable design burden. At the same time, the total impedance can remain the same, leaving the steady state current level unchanged.

While much of the present description is presented in terms of implementation in a tape-based data storage system for clarity and to place the invention in a context, it should be kept in mind that the general concepts presented herein may have broad applicability to electronic devices of other types.

Figure 1:
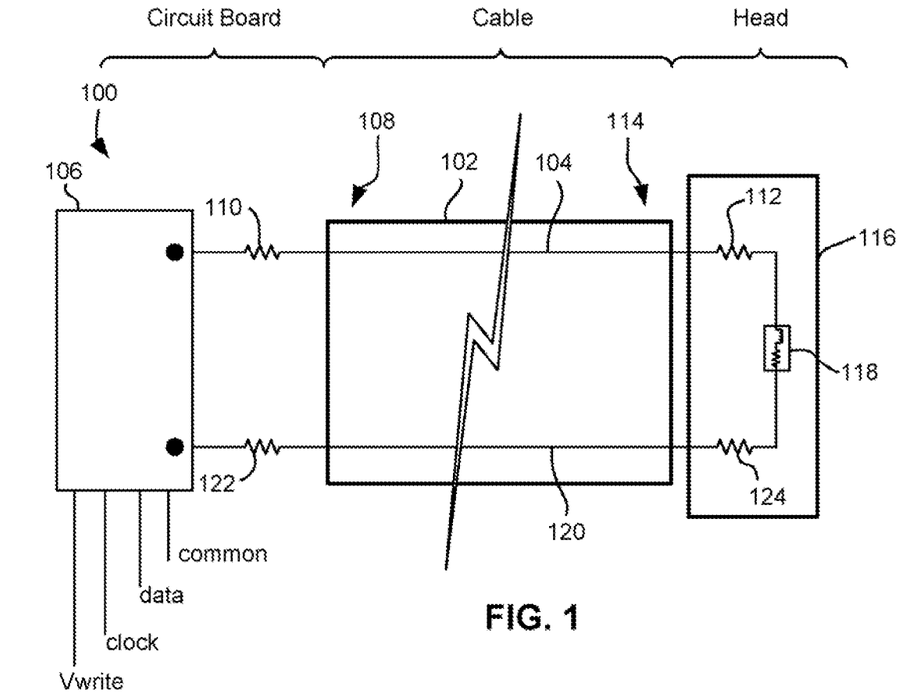
FIG. 1 is a system diagram of a magnetic storage system according to one embodiment of the present invention.

FIG. 1 illustrates a magnetic storage system 100 according to one embodiment. As shown, the storage system includes a cable 102 having a characteristic impedance associated with a first conductor 104 and a second conductor 120 as determined by geometry of the cable and materials forming the cable. Various types of cables are contemplated. In one approach, the cable includes pairs of conductors often configured in an over/under arrangement. An alternative configuration is a strip line configuration in which pairs of wires are positioned over a ground plane.

A write signal generator 106 is coupled to the first and second conductors 104, 120 towards a first end 108 of the cable 102, where the end of the cable 102 is the point where the current is applied, and not necessarily the true end of the cable 102. The write signal generator preferably includes an H-driver of a type known in the art. However, other types of write signal generators may be used, such as current mode drivers which are commonly used in disk drive systems.

One or more first devices 110, 122 (e.g., resistor or other component that provides an impedance) is coupled to the first end 108 of the cable 102 in series with the write signal generator 106 and the cable conductors, the first devices 110, 122 providing a first impedance. One or more second devices 112, 124 (e.g., resistor or other component that provides an impedance) is coupled to a second end 114 of the cable 102 in series with the cable conductors and the first device, the second devices 112, 124 providing a second impedance. A head 116 having at least one write transducer 118 is operatively coupled to the cable 102 and the second devices 112, 124. The head 116 may be of standard construction of a type known in the art, with the exception of heads having integral impedance-providing devices as set forth below, such heads being otherwise of standard construction.

This configuration, as well as those set forth elsewhere herein, enables the designer to better match the impedance of the write signal generator 106 circuit (which may include one first device 110 or multiple first devices 110, 122) with the characteristic impedance of the cable 102.

In one approach, the first impedance approximately matches the cable's characteristic impedance, e.g., is within ±10% thereof. Impedance matching is the practice of attempting to make the output impedance of a source (e.g., write signal generator 106) equal to the input impedance of the load (e.g., cable 102) to which it is connected, usually in order to maximize the power transfer and minimize reflections from the load.

During a write operation, the greatest power is delivered to the cable 102 when the characteristic impedance of the cable 102 is equal to the complex conjugate of the impedance of the source (that is, its internal impedance). For two impedances to be perfect complex conjugates, their resistances must be equal, and their reactances must be equal in magnitude but of opposite signs.

In the systems discussed herein and in most cables and write drivers, the reactive components of the impedances are small enough to be ignored. In this case, maximum power transfer occurs when the resistance of the load is equal to the resistance of the source.

Keeping in mind that a certain total impedance in the circuit is necessary for the write transducer 118 to function correctly, the impedance provided by the second device(s) 112, 124 can be selected to provide the remaining necessary impedance, taking into account the impedance provided by the head. The total resistance of the circuit that determines the final current includes the first impedance (e.g., resistors 110, 122), the second impedance (e.g., from resistors 112, 124), and the head resistance itself. In the DC steady state, the characteristic impedance of the cable plays no role in the determining the final steady state current. However the cable may also have a small DC resistance which must be considered in addition to the above resistances to compute the total steady state current. Upon reading this disclosure, those skilled in the art will appreciate how to select an impedance value for the second device(s) 112, 124, and therefore, an extensive discussion will not be provided. Rather, consider the following example. Assume at design time, the total impedance required between the write signal generator 106 and the write transducer 118 is 550 ohms. Also assume that the cable's characteristic impedance is 50 ohms. Further, assume that the reactance of the cable and write driver are negligible, and that the resistance of the head is 50 ohms. If the first device(s) 110, 122 provides an impedance of 500 ohms, while the cable's characteristic impedance is 50 ohms, the circuit will exhibit reflections and slower rise times. To match impedances, the first devices 110, 122 are selected to provide a total first impedance of 50 ohms, to match the cable's characteristic impedance (50 ohms). To obtain the requisite 500 ohms of total resistance in the path, the second devices 112, 124 are designed to provide a total second impedance of 450 ohms. Because of the impedances match, more power can be coupled into the cable, reflections are suppressed, and faster rise times result.

In some applications, it may be desirable to create an impedance mismatch to achieve a specific time dependant voltage profile during switching. The mismatch may include a first impedance that is higher or lower than the cable's characteristic impedance. For example it may be desirable to have a certain amount of overshoot in the voltage during switching. One way in which this can be achieved is to create an appropriate mismatch between the driver and cable's characteristic impedance. In this case, the desired amount of overshoot can be created by using the above technique, and adjusting the first resistance to create the desired mismatch, and placing the residual resistance at the other end of the cable.

The location of the second devices 112, 124 is not critical. Rather, it is generally preferred that they be positioned towards the second end 114 of the cable 102, between the cable 102 and head 116, or on the head 116 itself. Note also that for heads with multiple write transducers, each write transducer 118 may have an individual set of second devices 112, 124 associated with it.

In one approach, the second devices 112, 124 are formed on the head 116 itself. For example, the second devices 112, 124 may include one or more thin film resistors processed in the wafer during write head 116 thin film fabrication. The resistor may be constructed of a material having a relatively high resistivity, thus enabling smaller resistor dimensions, as there are typically space limitations on the wafer. One such material is tantalum. The resistor may have a serpentine shape. One end of the resistor connects to a cable 102 contact pad on an outer surface of the head 116, and the other end connects to a write transducer 118 lead. Resistors may be connected to one or both writer leads.

In the embodiment shown in FIG. 1, the second impedance is in series with the write transducer 118. However, as set forth below, variations include impedances in parallel with the write transducer 118, and impedances both in parallel and in series with the write transducer 118. Accordingly, each of the various embodiments presented herein may have impedances located in series and/or in parallel with the write transducer 118.

Figure 2:
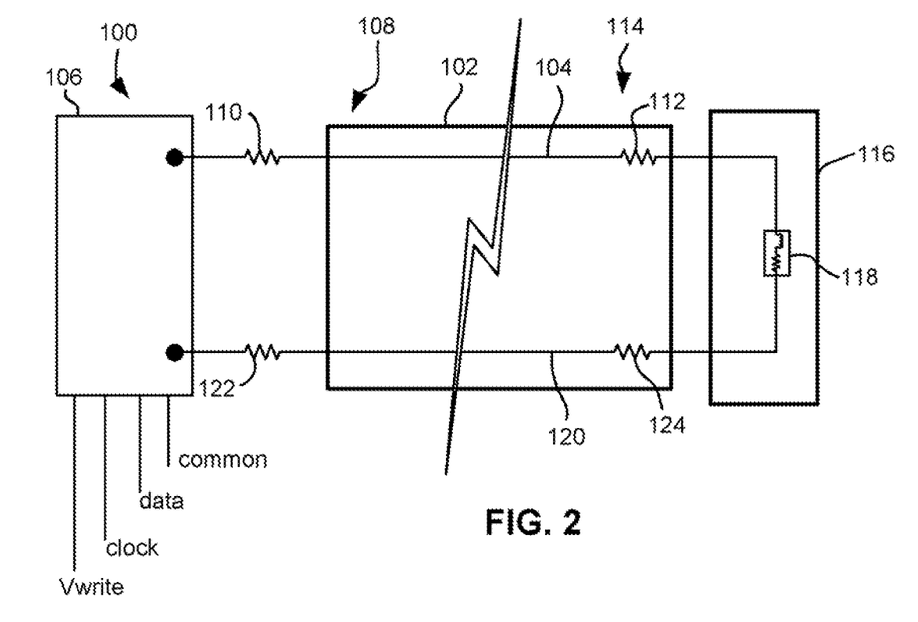
FIG. 2 is a system diagram of a magnetic storage system according to another embodiment of the present invention.

In another approach, shown in FIG. 2, the second devices 112, 124 are integral with the cable 102. The second devices 112, 124 may each include a resistor or other impedance-providing device formed during cable 102 fabrication using known processes, added to the cable 102 after encasement of the conductors, etc.

Figure 3:
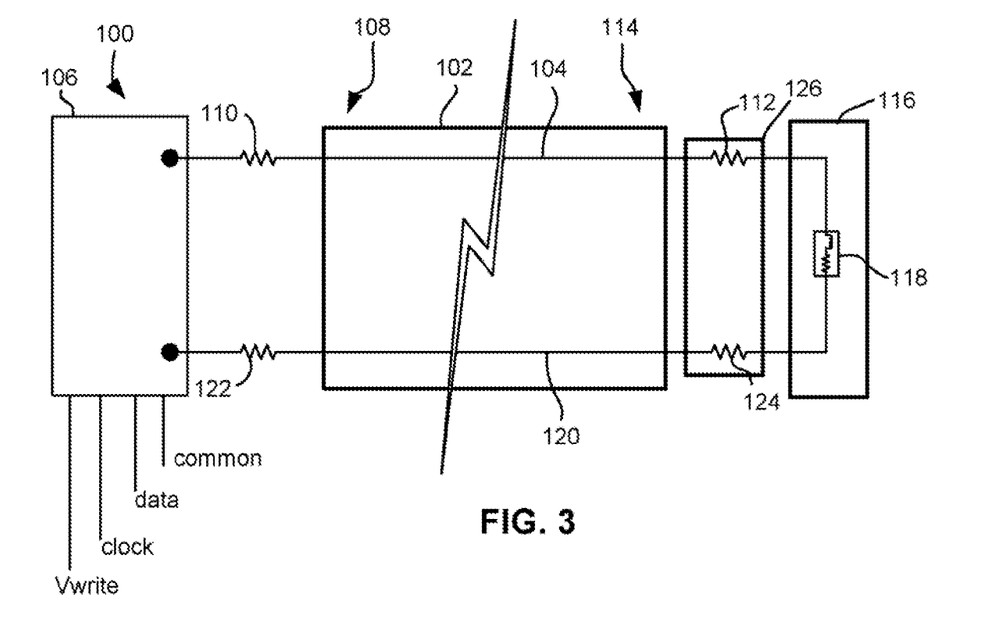
FIG. 3 is a system diagram of a magnetic storage system according to another embodiment of the present invention.

In yet another approach, shown in FIG. 3, the second devices 112, 124 are positioned between the cable 102 and the head 116. Such second devices 112, 124 may be formed on an insert 126 such as a chip, printed circuit board, etc. and inserted between the head 116 and the cable 102 during drive build. The insert 126 may be coupled to the head 116 and/or cable 102 using standard bonding techniques such as anisotropic conducive film (ACF) bonding, sonic welding, wire bonding, etc.

Referring to FIGS. 1-3, in particularly preferred embodiments, a pair of first devices 110, 122 are present. Similarly, a pair of second devices 112, 124 are preferably present. While the impedances provided by first devices 110, 122 may be the same, they could also be different.

Figure 7:
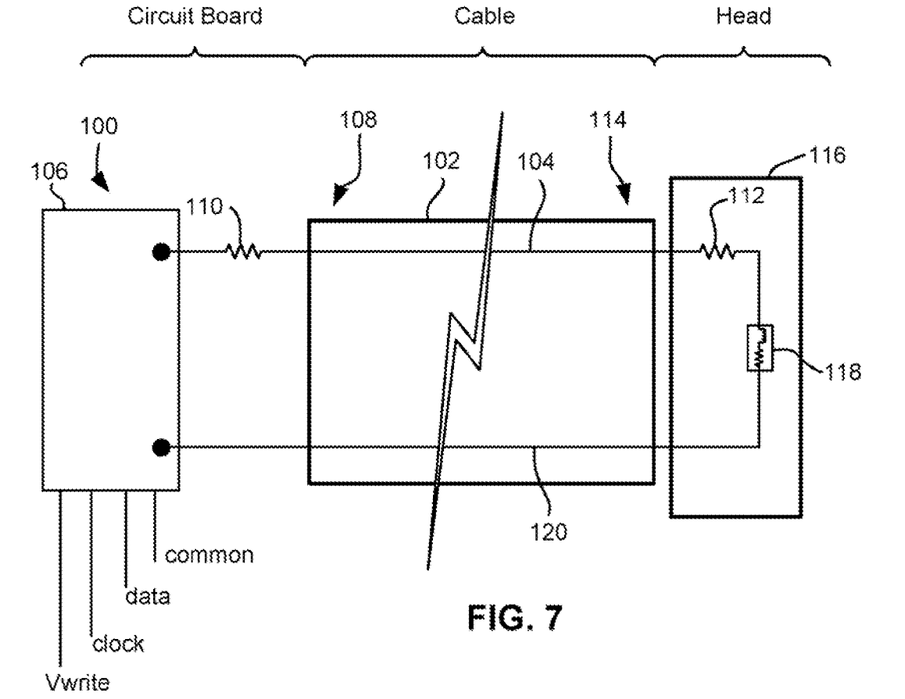
FIG. 7 is a system diagram of a magnetic storage system according to another embodiment of the present invention.

In alternate embodiments, only a single first device (e.g., device 110 or 122) and/or a single second device (e.g., device 112 or 124) may be present. FIG. 7 illustrates a variation of the embodiment of FIG. 1, now having a single first device 110 and a single second device 124.

In various embodiments, resistors may be connected to one or both writer leads. In addition a resistor, or resistors, may be connected across the writer leads, either before or after the series resistors. Another configuration is an H, in which the shunt (parallel) resistor is connected between a pair of resistors in series with each lead. Further, the write resistors may be connected elsewhere in the wafer, for example to the head 116 substrate via an additional series resistor.

In such embodiments where a resistor or resistors are coupled between the leads, some of the current shunts through a path parallel to the head. This increases the amount of current that must be sent through the circuit to properly drive the head. Therefore, the impedances provided by first devices 110, 122 may be lowered to allow more current to flow through the circuit. This in turn improves the matching between the write signal generator circuit and characteristic impedance of the write head cable.

Figure 4:
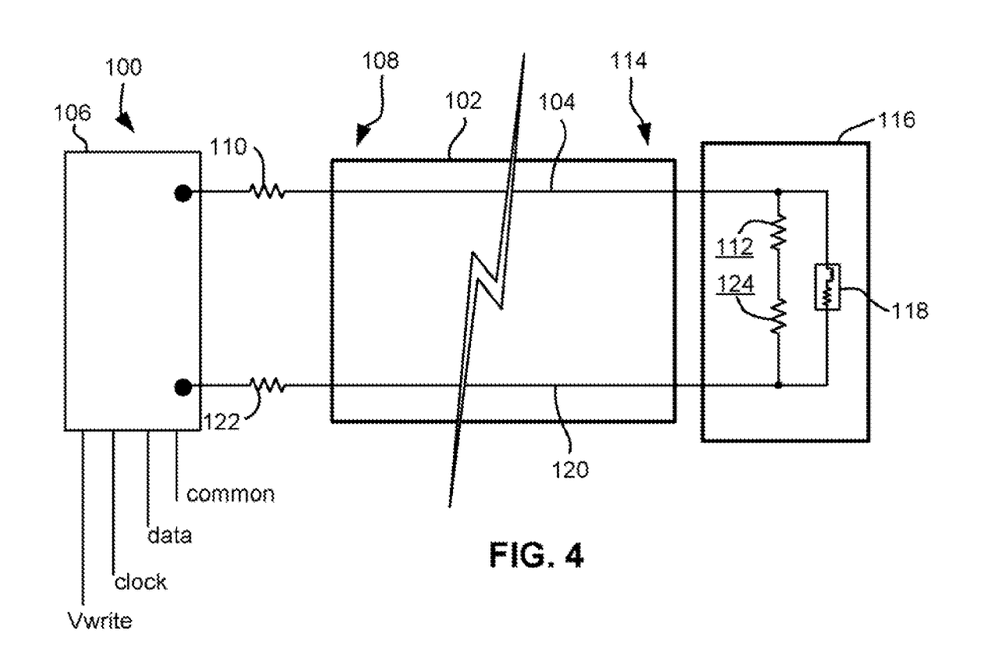
FIG. 4 is a system diagram of a magnetic storage system according to another embodiment of the present invention.

FIG. 4 illustrates an embodiment in which the second device 112 and the fourth device 124 are in series with each other, are in parallel with the write transducer 118. This embodiment is particularly useful where the write signal is toggled between positive and negative values. If a differential voltage source is used with positive and negative values of the same magnitude, the center point between the second and fourth devices 112, 124 is about zero. Note that additional devices (not shown) may also be present in series with the write transducer 118 towards the second end 114 of the cable 102. Again, the second and fourth devices 112, 124, as well as any additional devices, may be formed on the head 116, formed on the cable 102, or as a separate piece inserted between the cable 102 and head 116.

Figure 5:
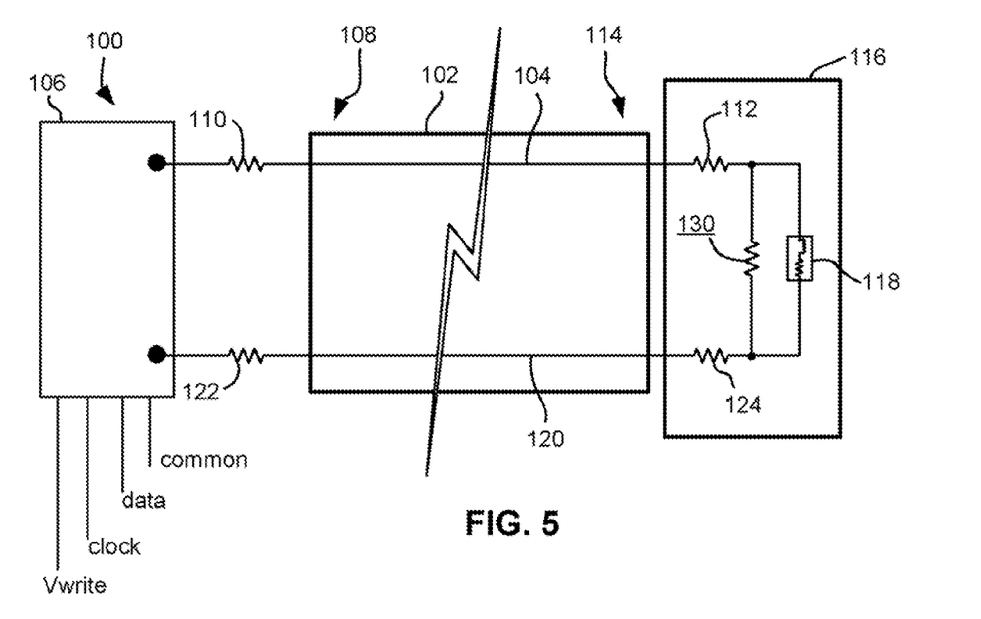
FIG. 5 is a system diagram of a magnetic storage system according to another embodiment of the present invention.

FIG. 5 depicts an embodiment in which a fifth device 130 (e.g., resistor or other component that provides an impedance) is operatively coupled to the first and second conductors 104, 120 towards the second end 114 of the cable 102, the fifth device 130 providing a fifth impedance across the first and second conductors. In this embodiment, the fifth device 130 is located after the second and fourth devices 112, 124. Again, the fifth device 130 may be formed on the head 116, formed on the cable 102, or as a separate piece inserted between the cable 102 and head 116.

Figure 6:
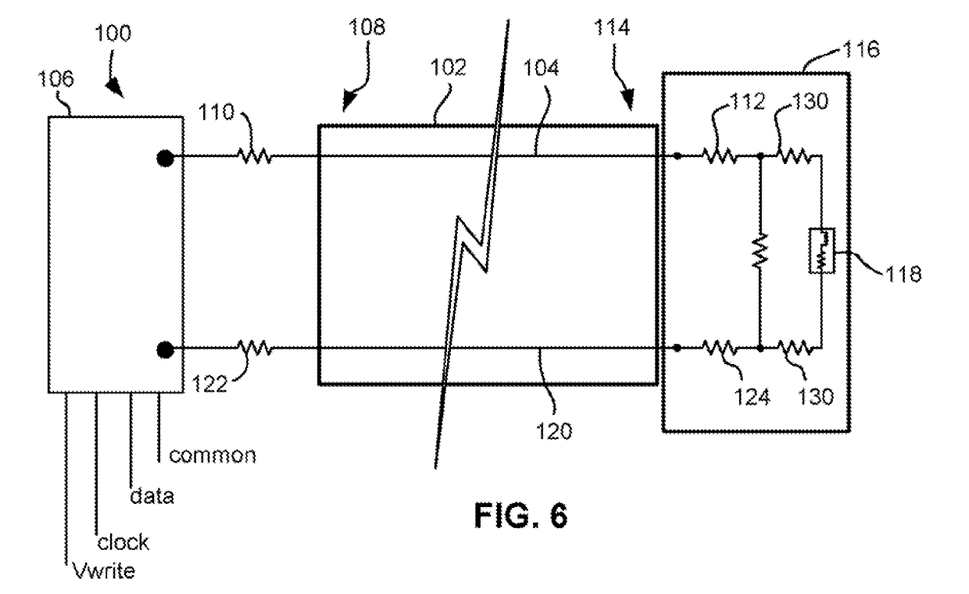
FIG. 6 is a system diagram of a magnetic storage system according to another embodiment of the present invention.

FIG. 6 depicts yet another embodiment in which a pair of sixth devices 130 are positioned in series with the second and fourth devices 112, 124.

In any of the embodiments described herein, the devices may include resistors. Again, resistors may be coupled to one or both write transducer leads. Resistors in the various embodiments may have resistance values in the range of a few ohms to several hundred ohms. The resistors may be constructed of a material having a relatively high resistivity, thus enabling smaller resistor dimensions, as there are typically space limitations on the wafer. One such material is tantalum. The resistor may have a serpentine shape.

Figure 9:
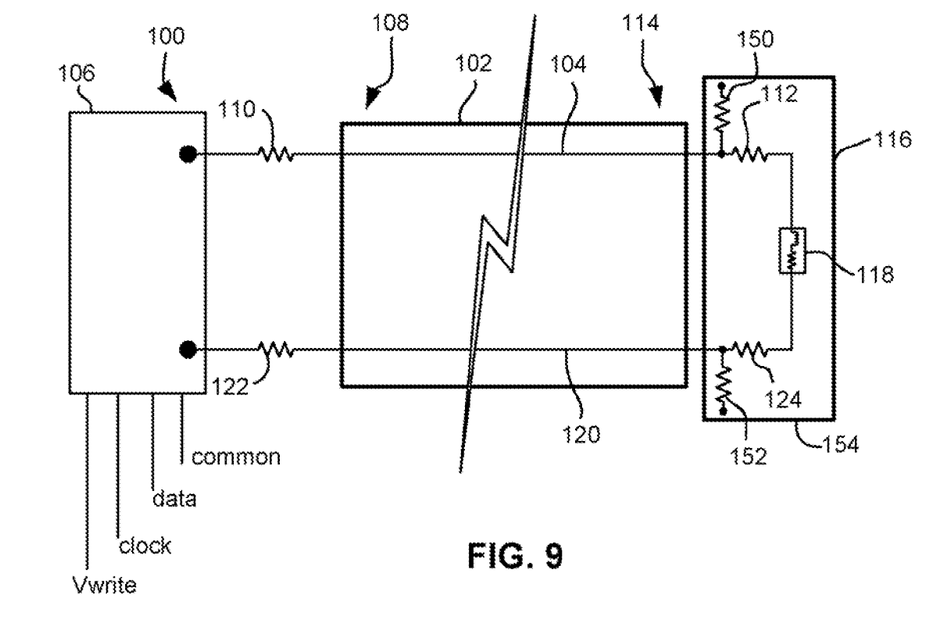
FIG. 9 depicts an embodiment in which resistors are formed on the wafer with the writer.

FIG. 9 depicts an alternate embodiment in which resistors 150, 152 are formed on the wafer with the writer 118. The resistors 150, 152 are coupled between the leads and the head substrate 154. Alternatively, the resistors 150, 152 may be coupled to a common line such as a ground plane of the cable.

Figure 10:
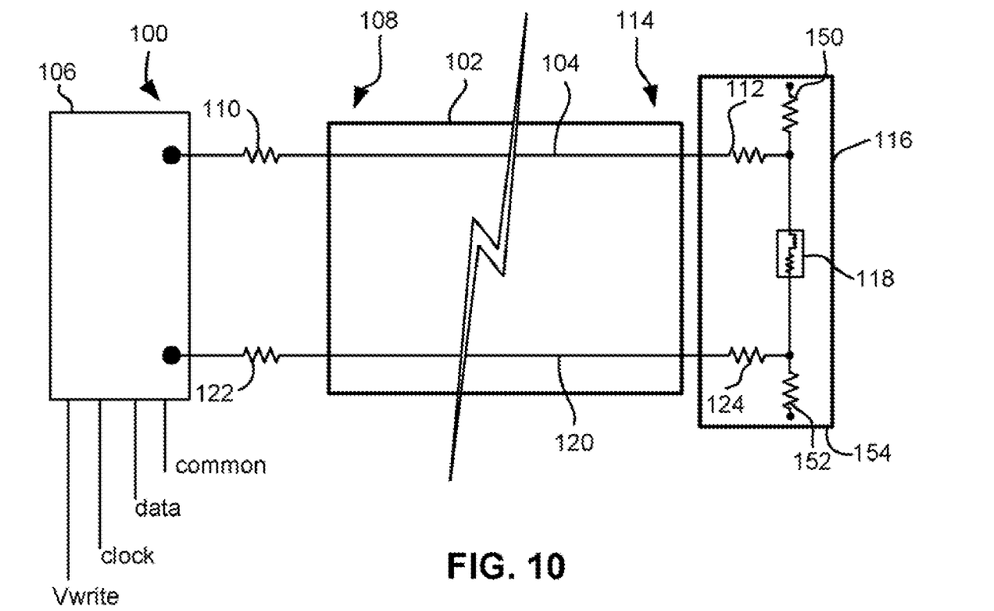
FIG. 10 depicts an embodiment in which resistors are formed on the wafer with the writer.

FIG. 10 depicts another alternate embodiment in which resistors 150, 152 are formed on the wafer with the writer 118. The resistors 150, 152 are coupled between the leads and the head substrate 154. Alternatively, the resistors 150, 152 may be coupled to a common line such as a ground plane of the cable.

Figure 11:
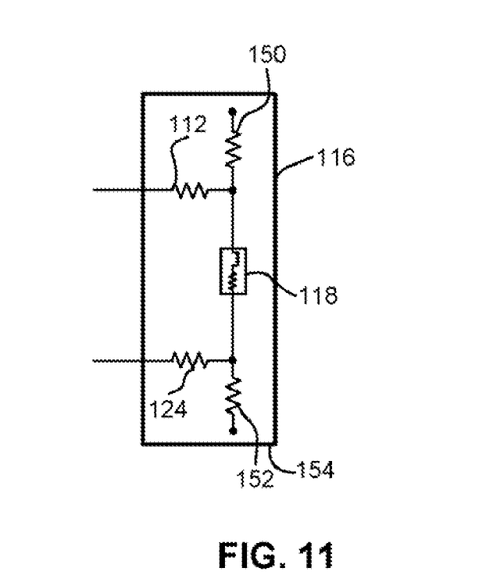
FIG. 11 depicts an embodiment in which resistors are formed on the wafer with the writer.

Embodiments of write heads with integrated resistors, including the embodiments of FIGS. 9 and 10, are independently useable in systems with or without regard to the impedance matching discussed above. To exemplify, FIG. 11 illustrates a standalone head 116 according to one embodiment.

In any of the embodiments, the head 116 may include one or more writers 118.

Figure 8:
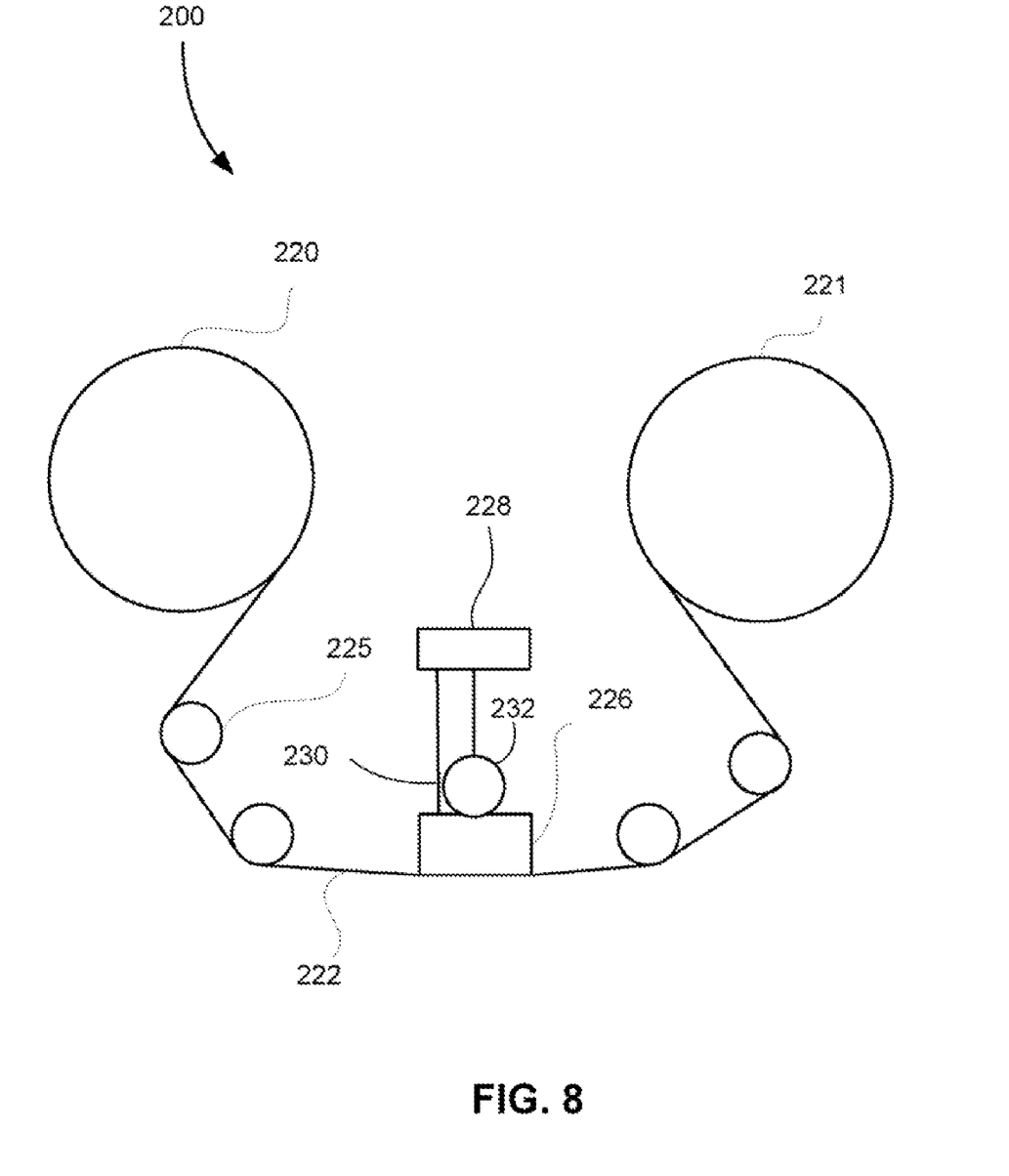
FIG. 8 is a schematic diagram of a tape drive system.

FIG. 8 illustrates a simplified tape drive 200 which may be employed in the context of the present invention. While one specific implementation of a tape drive 200 is shown in FIG. 8, it should be noted that the embodiments of the previous figures may be implemented in the context of any type of tape drive system.

As shown, a tape supply cartridge 220 and a take-up reel 221 are provided to support a tape 222. These may form part of a removable cassette and are not necessarily part of the system. Guides 225 guide the tape 222 across a preferably bidirectional tape head 226. An actuator 232 controls position of the head 226 relative to the tape 222. The tape head 226 is in turn coupled to a controller assembly 228 via a connector cable 230. The controller 228, in turn, controls head functions such as servo following, write bursts, read functions, etc. The controller 228 runs under the control of computer instructions typically in firmware or software run locally or on a host system.

A tape drive, such as that illustrated in FIG. 8, includes drive motor(s) to drive the tape supply cartridge 220 and the take-up reel 221 to move the tape 222 over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art. Examples of a host system include a computer, server, handheld device, etc. in communication with the interface device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic storage system, comprising:
   a cable having a characteristic impedance associated with a pair of conductors thereof;
   a write signal generator coupled to the pair of conductors towards a first end of the cable;
   at least one first device coupled to the first end of the cable in series with the write signal generator and at least one of the cable conductors, the at least one first device providing a first impedance, wherein two first devices are present;
   at least one second device coupled to a second end of the cable in series with at least one of the cable conductors and the first device, the at least one second device providing a second impedance, wherein two second devices are present;
   a head having a write transducer coupled to the at least one second device; and
   a third device coupled to the conductors of the cable towards the second end of the cable, the third device providing a third impedance across the conductors.

2. A system as recited in claim 1, wherein the first impedance approximately matches the cable's characteristic impedance.

3. A systems recited in claim 1, wherein the first impedance is greater than the cable's characteristic impedance.

4. A system as recited in claim 1, wherein the first impedance is less than the cable's characteristic impedance.

5. A system as recited in claim 1, wherein the at least one second device is formed on the head.

6. A system as recited in claim 5, wherein the at least one second device is in series with the write transducer.

7. A system as recited in claim 5, wherein the at least one second device includes a resistor comprising tantalum.

8. A system as recited in claim 1, wherein the at least one second device is integral with the cable.

9. A system as recited in claim 1, wherein the at least one second device is positioned between the cable and the head.

10. A system as recited in claim 1, wherein impedances provided by the first devices are about the same.

11. A system as recited in claim 1, wherein impedances provided by the first devices are different.

12. A system as recited in claim 1, wherein the at least one second device is in parallel with the write transducer.

13. A magnetic storage system, comprising:
    a cable having a first conductor and a second conductor, the cable having a characteristic impedance;
    a write signal generator coupled to the first conductor towards a first end of the cable;
    a first device coupled to the first conductor towards the first end of the cable in series with the write signal generator and the cable, the first device providing a first impedance;
    a second device coupled to the first conductor towards a second end of the cable in series with the cable and the first impedance, the second device providing a second impedance;
    a third device coupled to the second conductor towards the first end of the cable in series with the cable, the third device providing a third impedance;
    a fourth device coupled to the second conductor towards the second end of the cable in series with the cable, the fourth device providing a fourth impedance; and
    a head having a write transducer connected in series with the conductors of the cable.

14. A system as recited in claim 13, wherein the second device and the fourth device are in parallel with the write transducer.

15. A system as recited in claim 13, wherein the second device and the fourth device are in series with the write transducer.

* * * * *